United States Patent
Axnas et al.

(10) Patent No.: US 8,582,704 B2
(45) Date of Patent: Nov. 12, 2013

(54) COMMUNICATIONS UNIT AND METHOD FOR DETECTING PULSE INTERFERENCE

(75) Inventors: Johan Axnas, Solna (SE); Vimar Bjork, Goteborg (SE); Markus Ringstrom, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 559 days.

(21) Appl. No.: 12/936,726

(22) PCT Filed: Apr. 8, 2008

(86) PCT No.: PCT/SE2008/050403
§ 371 (c)(1),
(2), (4) Date: Oct. 7, 2010

(87) PCT Pub. No.: WO2009/126074
PCT Pub. Date: Oct. 15, 2009

(65) Prior Publication Data
US 2011/0038405 A1    Feb. 17, 2011

(51) Int. Cl.
*H04B 1/10*    (2006.01)

(52) U.S. Cl.
USPC .......................................... 375/349; 375/346

(58) Field of Classification Search
USPC ......... 375/130, 140, 141, 144, 147–149, 316, 375/322, 324–325, 334–352
See application file for complete search history.

(56) References Cited

U.S. PATENT DOCUMENTS

| | | | | |
|---|---|---|---|---|
| 5,307,515 | A * | 4/1994 | Kuo et al. | 455/295 |
| 6,625,433 | B1 * | 9/2003 | Poirier et al. | 455/232.1 |
| 7,324,437 | B1 * | 1/2008 | Czylwik et al. | 370/210 |
| 7,697,645 | B2 * | 4/2010 | Jong | 375/346 |
| 7,940,869 | B2 * | 5/2011 | Tandai et al. | 375/346 |
| 8,086,204 | B2 * | 12/2011 | Uramoto et al. | 455/296 |
| 8,391,374 | B2 * | 3/2013 | Husted et al. | 375/252 |
| 2002/0114385 | A1 * | 8/2002 | Gu et al. | 375/231 |
| 2003/0087622 | A1 | 5/2003 | Jayaraman et al. | |
| 2004/0137849 | A1 * | 7/2004 | Kloper et al. | 455/67.11 |
| 2006/0058035 | A1 | 3/2006 | Tsuruno | |
| 2006/0209972 | A1 | 9/2006 | Lemberger et al. | |
| 2010/0029235 | A1 * | 2/2010 | Bouillet | 455/226.2 |
| 2013/0034195 | A1 * | 2/2013 | Takahashi et al. | 375/346 |

FOREIGN PATENT DOCUMENTS

WO    WO02007/129737    * 11/2007    ............. H04B 7/26

* cited by examiner

*Primary Examiner* — Sam K Ahn
*Assistant Examiner* — James M Perez
(74) *Attorney, Agent, or Firm* — Coats & Bennet, P.L.L.C.

(57) ABSTRACT

A communication method for use in a first cellular communications system is proposed for minimizing the interference caused by strong interfering pulses in the same frequency band as the system or an adjacent frequency band. The method comprises the steps of Receiving an incoming signal Bandpass filtering the incoming signal to filter out a first frequency band (B1) used by the communications system and forwarding the bandpass filtered signal to a receiver unit (35) for processing and forwarding the processed signal to a signal detector (37) arranged to detect the wanted signal. Redirecting a fraction of the received signal and detecting the power of the redirected fraction. Using the detected power to modify the function of the signal detector (37).

15 Claims, 5 Drawing Sheets

COMMUNICATIONS UNIT AND METHOD FOR DETECTING PULSE INTERFERENCE

TECHNICAL FIELD

The present invention relates to a communications unit, such as a radio base station or a mobile terminal for use in a cellular communications system. The invention also relates to a method for use in such a system

BACKGROUND AND RELATED ART

One of the scarcest resources in current and future wireless communication systems for providing more capacity and higher data rates is available frequency spectrum. A possible way forward to meet the demands for more spectrum is to use the limited spectrum in a more efficient way, e.g. through spectrum sharing. This means that different systems are allocated to the same spectrum, the systems possibly being of completely different kinds (e.g. a radar system and a terrestrial mobile communication system). To be able to share spectrum, the interference from the other systems must be managed in a proper way.

In current mobile communication systems, interference from other systems is normally not dealt with in any particular way. It is handled as thermal noise or infra-system interference, and hence the co-existence with other systems within the same spectrum is virtually impossible. Due to the fact that interference affecting reference symbols, control signalling, synchronization symbols and user data affects the system differently, a strong interfering pulse from e.g. a radar system, though very short in time, might severely impact the performance of the system by affecting the synchronization symbols, reference symbols and/or control signalling. This is because achieving synchronization is a necessary first step, reference symbols are assumed to be representative for the data and control signalling is used for decoding data. The interference may be handled in different ways, for example by means of compensation, or by discarding affected symbols or blocks. To enable this, the interfering pulses must be detected in a reliable way.

SUMMARY OF THE INVENTION

The invention is primarily intended to solve the problem of deploying a (mobile) communication system in a frequency spectrum where there is interference present from another system (preferred embodiment). The interference may be co-channel interference, adjacent interference or any other type of interference. The other system is considered an interferer to the mobile communication system and is assumed to transmit short radio pulses with high energy. A pulse is considered short if its duration is considerably shorter than the time between successive pulses. Alternatively, a pulse may be considered short if it is shorter than the interval between, or period of, resources allocated to certain signals vital to the system (for example, synchronization signalling, control signalling, or reference symbols). A radio pulse with the described characteristics will be referred to as a Strong Interfering Pulse (SIP) for the remainder of this document. The interpretation of the phrase "considerably shorter" may vary. In some situations the pulse duration should be shorter than one half of the time between the starting points of two consecutive pulses. In other contexts the pulse duration should possibly be shorter than one third of the time between the starting points of two successive pulses.

The invention relates to a communication unit for use in a wireless communication system operating in a first frequency band, said communication unit comprising a receiver unit for processing the received signal in the first frequency band and a signal detector arranged to receive the processed signal from the receiver unit and detect a wanted signal, said communication unit being characterized in that it further comprises interference detection circuitry arranged to detect the presence of an interfering pulse and feeding information about the presence of an interfering pulse to the signal detector, and in that the signal detector is arranged to modify its detection algorithm based on the received information.

As will be obvious to the skilled person, the inventive idea can be applied in other types of mobile or wireless communications systems as well.

The invention also relates to a communication method for use in a first cellular communications system, comprising the steps of Receiving an incoming signal Bandpass filtering the incoming signal to filter out a first frequency band used by the communications system and forwarding the bandpass filtered signal to a receiver unit for processing and forwarding the processed signal to a signal detector arranged to detect the wanted signal.

Redirecting a fraction of the received signal and detecting the power of the redirected fraction Using the detected power to modify the function of the signal detector.

The second system may, for example be a radar system, transmitting radar pulses in a frequency range that will affect the cellular system. By employing the technique of the invention, more of the scarce resource radio spectrum will be available for mobile communication systems, for example, guard bands of frequency bands where different kinds of radar systems are operated today.

In a preferred embodiment, the communication unit further comprises a directional coupler arranged to direct a fraction of the received signal to the interference detection circuitry. Typically, the interfering pulse will have its maximum in a second frequency band adjacent the first, but will cause interference also in the first frequency band.

The directional coupler may be arranged to direct a fraction of the input signal to the receiver unit to the interference detection circuitry after bandpass filtering of the signal, in which case the interference detection circuitry is arranged to detect the presence of an interfering pulse in the first frequency band.

Alternatively, or additionally, the directional coupler may be arranged to direct a fraction of the whole signal received by the communication unit, before bandpass filtering out the input signal to the receiver, to the interference detection circuitry. In this case, the interference detection circuitry is preferably arranged to detect signal power in a second frequency band adjacent the first frequency band, as an indicator of interference in the first frequency band.

In one embodiment, the interference detection circuitry comprises a power detector arranged to detect signal power of the first frequency band as an indicator of interference in the first frequency band. The power of the strong interfering pulse will normally be much higher than the signal power of the wireless communication system.

In an alternative embodiment, the interference detection circuitry is arranged to a characteristic of power spectrum density of the interfering pulse as an indicator of interference.

To perform the calculations, the communication unit may comprise various circuitry, for example including a signal to noise ratio calculator arranged to receive the wanted signal from the signal detector and calculate the signal to noise ratio of the wanted signal, a noise/SIP calculator arranged to receive the signal to noise ratio from the calculator and information about the presence of an interfering pulse from the interference detection circuitry and to predict the relationship between the signal to noise ratio and the SIP, and to forward information about said relationship to the detector.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
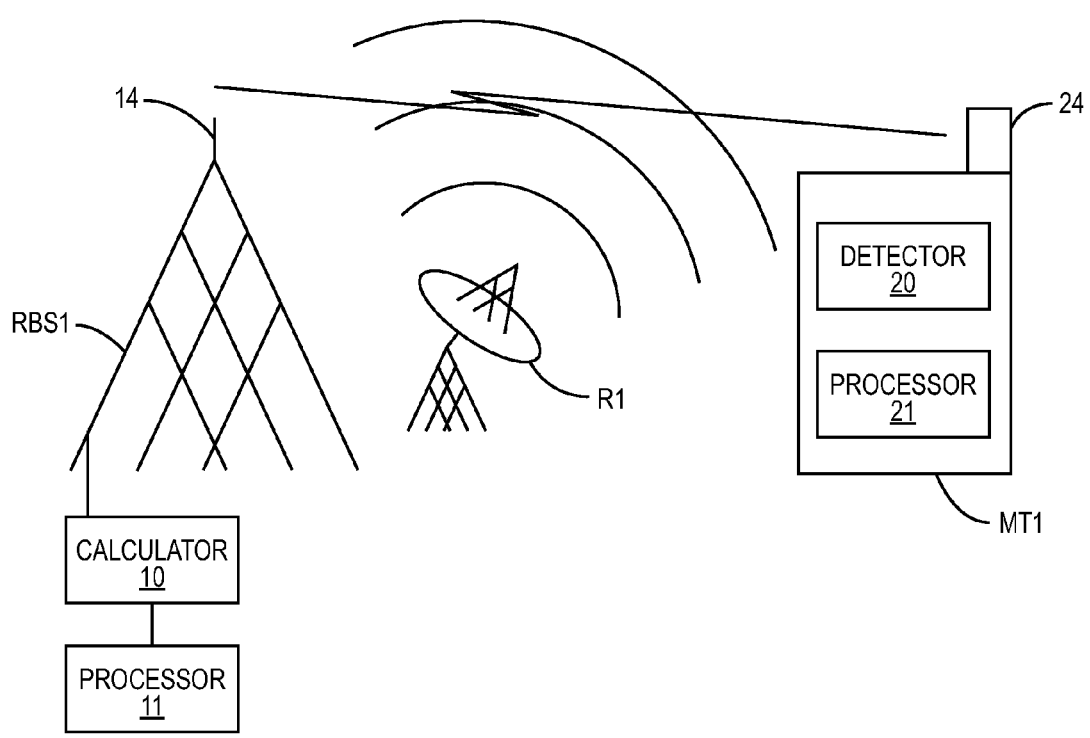
FIG. 1 illustrates, schematically, a situation where two different cellular systems share the same frequency spectrum and therefore interfere with each other.

FIG. 1 shows a simplified view of a cellular communications system, represented by a radio base station RBS1 in communication with a mobile terminal MT1. In this example, a radar system R1 operates in a frequency spectrum so that the radar pulses may cause interference in the cellular communications system. It should be understood that the interfering system could be any kind of system sending out pulses in a frequency spectrum that overlaps at least partially, or otherwise affects, the frequency spectrum of the cellular communications system.

According to the invention, at least one of the communicating units of the communications system, that is, the radio base station RBS1 or the mobile terminal MT1, comprises means for detecting interfering signals from the other system and for taking appropriate action. In FIG. 1, the radio base station RBS1 comprises calculating means 10 for detecting the presence of an interfering signal from the other communications system, and processing means 11 for determining and taking appropriate action based on the detection of the interfering signal. Information about the presence of an interfering signal could instead be received from another unit in the communications system (not shown).

It is assumed that the communications system sends out at least one type of system sensitive data at regular points in time, for example once, or a fixed number of times, in each frame. In this case, the processing circuitry 11 is arranged to determine new points in time at which to send the system sensitive data, so that the interfering pulses can be avoided. This may be done by calculating the new points in time as will be discussed in more detail below. Alternatively, possible new points in time may be stored in a table in association with the processing circuitry. In this case, if an interfering signal is detected, the processing circuitry will determine that the timing of the transmission of system sensitive data should be changed and select new points in time for this transmission from the table. The table may comprise different entries for different minimum spacings between the interfering pulses in accordance with the discussion below.

Similarly, the mobile terminals MT1 of the first system comprise detection circuitry 20 for detecting the presence of an interfering signal from the other communications system, and processing circuitry 21 for determining and taking appropriate action based on the detection of the interfering signal, in particular for determining new points in time, by calculation or by looking in a table. Each of the radio base station and the mobile terminal comprises a transmitter, represented in FIG. 1 by antennas 14, 24, respectively, for transmitting the signals at the new points in time instead of the predetermined points in time. It is of course possible to change the points in time only for some of the system sensitive information.

There are a number of design measures that can be taken in order to adapt a communication system for a situation where SIP interference is present. One measure is to make sure that a regular SIP does not affect system sensitive data every time. This can be accomplished by two different methods. One is to transmit the system sensitive data in a pseudo-random time fashion. In this case the interfering signal does not have to be periodic, or if it is periodic, the periodicity does not have to be known. Another method is to have a mechanism for interchanging system sensitive data with user data, or possibly with other system sensitive data, and choose the best placement for the system sensitive data. This is of course dependent on a way of communicating the change to the terminal and assumes that the SIP is more or less predictable.

For example, the synchronization symbols can be transmitted less regularly, i.e. not every $N^{th}$ frame for example. This is discussed in more detail below.

Similarly, reference symbols and control information could be transmitted less regularly. In the following an example of the inventive method applied to a system using first and second primary synchronization symbols will be described. As will be understood by the skilled person, similar methods can be applied to other types of symbols or information, that is allocated to resources having a periodic or regular structure, for example, reference symbols or control information.

Furthermore, system sensitive data can have different protection compared to the standard practice of today. Control information can e.g. be more interleaved over time, rather than over frequency only. Reference symbols can be placed denser and possibly transmitted with lower power.

According to a first preferred embodiment irregular spacing of the synchronization symbols is used to ensure that not all synchronization symbols are disturbed by interfering pulses.

In the following the invention will be discussed with reference to a Long Term Evolution (LTE) system. LTE is described, for example, in 3GPP TS 36.201 "Long-Term Evolution (LTE) physical layer; General description".

A simple way of detecting a strong interfering pulse would be to detect it, in the analog or digital domain, as a sudden onset of signal energy above a certain threshold. The signal energy of the strong interfering pulse will typically be much higher than the expected signal energy generated within the communications system.

Figure 2:
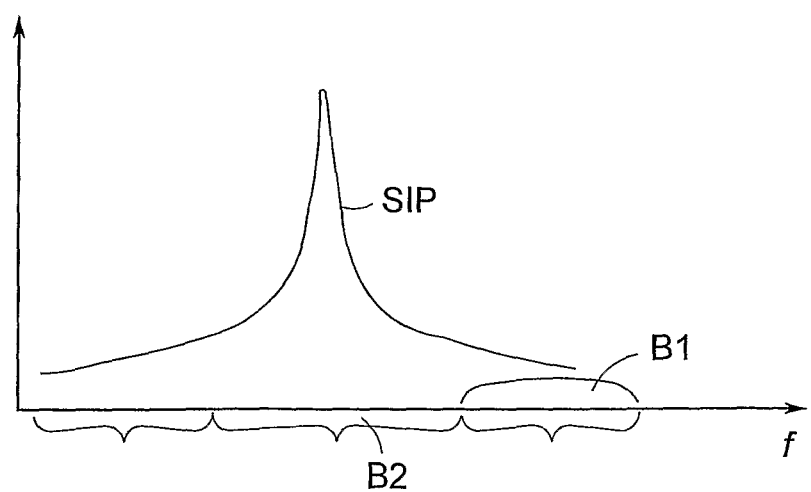
FIG. 2 illustrates, as an example, the frequency overlap of the communication system and the interfering system.

FIG. 2 illustrates one possible type of interference between the communication system and the interfering system. Frequency is shown along the horizontal axis and the vertical axis represents the power spectrum density. The communication system utilizes a first frequency band B1. The interfering system in this example operates in an adjacent frequency band B2, which does not overlap the first frequency band. The frequency spectrum of the strong interfering pulse is indicated by a curve SIP. As can be seen, the peak of the strong interfering pulse will be in the centre of the adjacent frequency band and will therefore be outside of the frequency band B1. However, a strong interfering pulse is expected to be so strong that its energy will leak into the band where the communication system is operated, as shown in FIG. 2. Therefore, measurements in the adjacent frequency band can be used to predict interference in the first frequency band, utilized by the communication system.

Another way to detect a SIP is to characterize the power spectrum density in the frequency band within which the communication system is operated. This is possible since the SIP signal energy decays over frequency, as shown in FIG. 2. This method can be used also if the interfering system is operated within the same frequency band as the communication system, as long as the power spectrum density of the SIP is known.

The inventive detection algorithm may be improved by obtaining a partial characterization of the SIP. If it is a SIP, the energy will decay quickly over time. How fast it decays depends on the environment. If it is a lightly dispersive environment, the decay will be faster than in a highly dispersive environment. Whether the environment is dispersive, can be estimated from channel estimates already inherent in the communication system. If the channel between the transmitter and the receiver is dispersive, it is likely that the channel that has affected the SIP is dispersive as well. This is due to the fact that the scatterers giving rise to the dispersive channel are likely to be close to the terminal rather than the transmitter. Should the signal energy not decay quickly enough over time, when the dispersiveness of the channel is taken into account, the interference is probably not a SIP.

It should be noted that if a SIP is detected on a symbol, it might affect also subsequent symbols due to the fact that the decay of signal energy is not immediate. However, in the subsequent symbols, the SIP might have decayed so much that it is not detectable. The number of affected subsequent symbols might be estimated from the estimation of the dispersiveness of the environment within which the communication system is operated.

Figure 3:
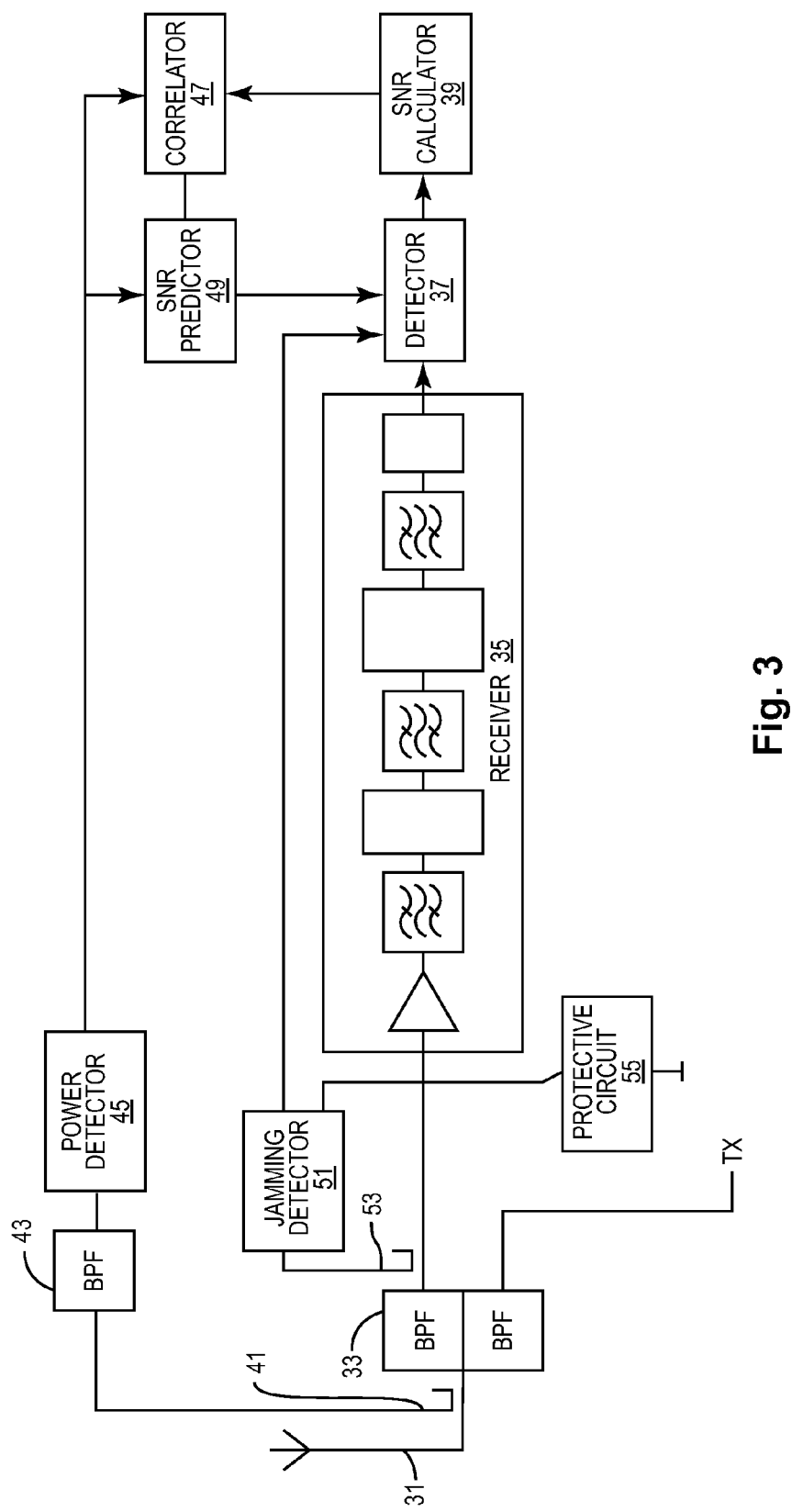
FIG. 3 illustrates a SIP detection and jamming detection device that may be used to implement the invention.

If a receiver is operating close to a SIP frequency band, its reception performance of the wanted signal can be improved by incorporating SIP detection and Jamming detection circuitry, for example, as shown in FIG. 3.

The receiver shown in FIG. 3 comprises an antenna 31 for transmitting and receiving signals. For the transmission of signals, a transmission part TX is arranged, which will not be discussed in any detail here. The received signals are filtered through a bandpass filter 33 and forwarded to an analog receiver 35 in a manner known in the art. From the receiver 35 the wanted signal is forwarded to a detector 37 and from the detector to an SNR calculator 39 arranged to calculate the signal to noise ratio SNR.

The circuitry shown in FIG. 3 comprises units for detecting strong interfering pulses in two different ways, which may be used separately, or together.

The first way of detecting the SIP pulse, as discussed briefly above, would be to detect the SIP pulse in the frequency band B2 of the interfering system. As mentioned above, this second frequency band 132 is usually adjacent to the first frequency band B1 but the two frequency bands B1, B2 may also overlap partly or completely. To this end, the device of FIG. 3 has a directional coupler 41 arranged in this example at the input to the bandpass filter 33, for directing a fraction of the incoming signal received by the antenna 31 to a second bandpass filter 43. The second bandpass filter 43 is arranged to filter out the SIP frequency band B2 as discussed in connection with FIG. 2. The filtered signal from the second bandpass filter is fed to a power detector 45 arranged to detect the power of the SIP signal. The signal from the power detector is fed to a noise/SIP correlator 47, which is also arranged to receive the calculated signal to noise ratio from the SNR calculator 39. The correlator 47 is arranged to correlate the SIP pulse power determined by the power detector 45 with the SNR of the wanted signal, calculated by the SNR calculator 39. The result of the correlation is fed to an SNR predictor 49. The SNR predictor 49 also receives the SIP power signal from the power detector 45, and is arranged to predict the in-channel noise, or SNR, during a strong interfering pulse based on the relationship between the in-band noise and the SIP pulse, and on the power signal from the power detector 45. The predicted SNR is fed to the detector 37, and can be used to improve the detection algorithm for the wanted signal during a strong interfering pulse. The SNR during a pulse can be predicted by the SNR predictor 49 before the affected signal reaches the signal detector 37, since the processing of the signal in the receiving unit 35 will take longer time than the processing in the power detector 45 and the SNR predictor 49.

In FIG. 3, a jamming detector 51 is also arranged, for detecting when the in-band signal is so high that it will be distorted in the receiver 35. The jamming detector receives a fraction of the in-band signal through a directional coupler 53 arranged downstream of the duplex filter 33 for directing a fraction of the in-band signal to the jamming detector 51. The jamming detector 51 is a power detector arranged to measure the in band power, which in turn is used to determine if the receiver is blocked or not. A protective circuit 55 is arranged at the input of the receiver 35. If the input power is too high for the receiver 35 the protective circuit 55 is switched in into the reception path to prevent the signal from reaching the receiver, thereby protecting the receiver. This will reduce the recovery time of the blocked receiver and protect it from permanent damage.

When the receiver is blocked or the input protection is switched in no useful information is fed to the detector 37. The state of the analog receiver 35 is signaled to the detector 37, and the detector can use this information to improve the detection algorithm for the wanted signal.

The detector 37 may use the information provided by the SNR predictor to improve the detection algorithm for the wanted signal. For example, any received bits that have an SNR lower than a predefined threshold may be omitted.

Figure 4:
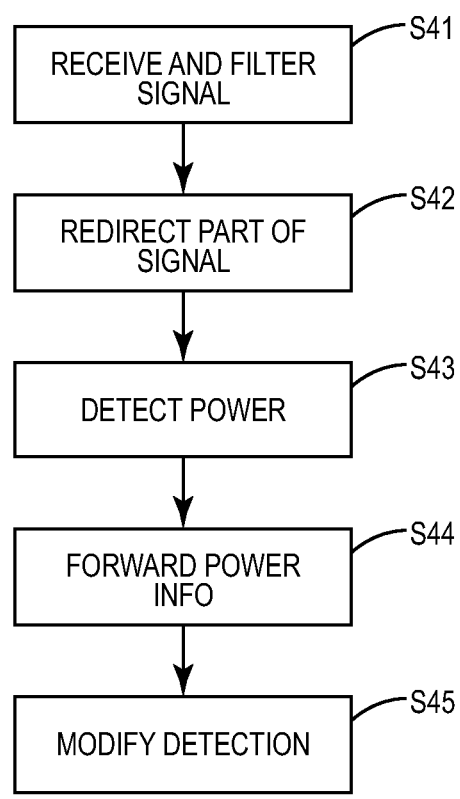
FIG. 4 is an overall flowchart of a method according to the invention.

Hence, an overall method according to the invention may be as shown in FIG. 4:

In step S41 a signal is received by the communication unit. The signal is bandpass filtered and forwarded to a receiver unit 35 in the communication unit for processing. The processed signal is fed from the receiver unit to a signal detector for detecting the wanted signal.

In step S42, which may be performed before or after bandpass filtering, a fraction of the received signal is redirected to a power detector. If the redirection is performed after bandpass filtering, that is, by the directional coupler 53 after bandpass filtering by the bandpass filter 33, the signal fed to the power detector will be the same as the input signal to the power detector. In this case, therefore, the power detector will detect the total power in the frequency band utilized by the communication unit. If the redirection is performed before bandpass filtering, that is, by the directional coupler 41 to the bandpass filter 43, the frequency range filtered out by the bandpass filter may be the same range as the one used by the communication unit or a different range. Preferably, in the latter case the bandpass filter 43 is arranged to filter out the frequency band of the strong interfering pulse.

In step S43 the power detector detects the power of the signal fed to it and in step S44 forwards information about the power to the signal detector. The information may be forwarded directly to the signal detector, or through an SNR predictor as will be discussed in more detail in connection with FIG. 5

In step S45 the signal detector 37 uses the received information to modify the detection algorithm.

In the simplest case, the power detected by the power detector is the total power in the frequency range utilized by the communication system. If this total power exceeds a predefined threshold, the receiving unit will not be able to handle the signal, and the receiving unit will be blocked. In this case it will be advantageous to prevent the too strong signal from reaching the receiving unit 35 by means of a protective circuit 55 as discussed above. The information that the input signal is too strong is also sent to the signal detector 37. Whether or not a protective circuit is arranged, the signal detector will know that the receiving unit 35 is to be blocked and that any signal received from it will not be reliable. The signal detector 37 will know this slightly before the signal from the receiving unit 35 is affected, because the processing in the receiving unit 35 will delay the signal slightly compared to the signal fed directly from the power detector 45, 51.

Figure 5:
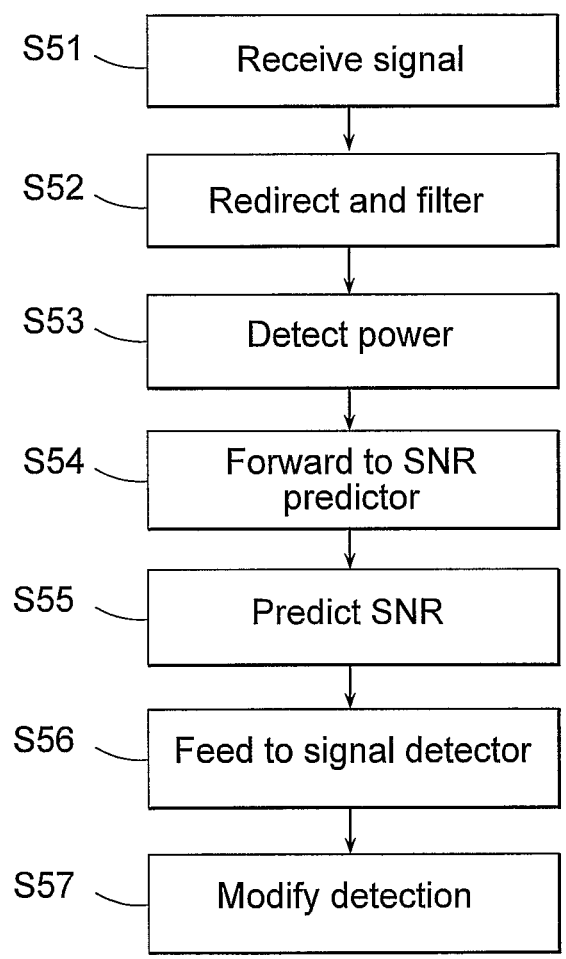
FIG. 5 is a more detailed flowchart of a method according to an embodiment of the invention.

A more sophisticated method is shown in FIG. 5.

In step S51 a signal is received by the communication unit. The signal is bandpass filtered forwarded to a receiver unit in the communication unit for processing. The processed signal is fed from the receiver unit to a signal detector for detecting the wanted signal.

In step S52 a fraction of the received signal before bandpass filtering is redirected to a power detector. This fraction is bandpass filtered. The frequency range filtered out by the bandpass filter may be the same range as the one used by the communication unit or a different range. Preferably the frequency range is the one used by the interfering system.

In step S53 the power detector detects the power of the signal fed to it and in step S54 forwards information about the power to a signal to noise ratio predictor 49.

In step S55 the signal to noise ratio predictor 49 predicts the signal to noise ratio during an interfering pulse based on the power information received in step S53 and information about the correlation between the signal to noise ratio of a normal signal received by the receiver unit, that is, a signal with no interfering pulse, and the SIP.

In step S56 the predicted signal to noise ratio is fed to the signal detector 37.

In step S57 the signal detector 37 modifies its detection algorithm based on the predicted signal to noise ratio to compensate for the presence of a strong interfering pulse.

In a preferred embodiment, long-term statistics are used to derive the relationship between the signal to noise ratio and the adjacent band power. In this way, the occurrence of interfering pulses can be predicted based on a registered pattern over time.

The invention claimed is:

1. A communication unit for use in a wireless communication system operating in a first frequency band, said communication unit comprising:
   a receiver unit for processing a received signal in the first frequency band;
   a signal detector configured to receive the processed signal from the receiver unit and detect a wanted signal;
   interference detection circuitry configured to detect the presence of an interfering pulse and feed information about the presence of the interfering pulse to the signal detector;
   a directional coupler configured to direct a fraction of the received signal to the interference detection circuitry; and
   a signal to noise ratio (SNR) calculator configured to receive the wanted signal from the signal detector, and to calculate an SNR of the wanted signal, predict a relationship between the SNR of the wanted signal and the interfering pulse, and forward information about said relationship to the signal detector;
   wherein the signal detector is arranged to modify a detection algorithm based on the information about the relationship between the SNR of the wanted signal and the interfering pulse.

2. The communication unit of claim 1, wherein the interference detection circuitry is configured to detect the presence of the interfering pulse in the first frequency band.

3. The communication unit of claim 1, wherein the interference detection circuitry is configured to detect the presence of the interfering pulse in a second frequency band adjacent the first frequency band, as an indicator of interference in the first frequency band.

4. The communication unit of claim 1, wherein the interference detection circuitry comprises a power detector arranged to detect a signal power of the first frequency band as an indicator of interference in the first frequency band.

5. The communication unit of claim 1, wherein the interference detection circuitry is configured to detect a characteristic of power spectrum density of the interfering pulse as an indicator of interference.

6. The communication unit of claim 1, further comprising a correlator configured to derive a correlation between information about the power of the interfering pulse received from the interference detection circuitry and the SNR of the wanted signal received from the SNR calculator, and an SNR predictor configured to receive information about the correlation from the correlator.

7. The communication unit of claim 6, wherein the SNR predictor is also configured to receive a Strong Interfering Pulse (SIP) power signal for a strong interfering pulse from a power detector included in the interference detection circuit, and is configured to predict an in-band noise during the strong interfering pulse based on the information about the correlation and on the SIP power signal for the strong interfering pulse, and to feed the predicted in-band noise to the signal detector.

8. A communication method for use in a first cellular communications system, comprising:
   receiving an incoming signal;
   band-pass filtering the incoming signal to filter out a first frequency band used by the communications system and forwarding the band-pass filtered signal to a receiver unit for processing and forwarding the processed signal to a signal detector arranged to detect the wanted signal;
   directing a fraction of the received incoming signal to an interference-detection circuitry to obtain information about the presence of an interfering pulse;
   receiving the wanted signal from the signal detector and calculating the signal to noise ratio (SNR) of the wanted signal, receiving the calculated SNR of the wanted signal and the information about the presence of an interfering pulse and predicting a relationship between the SNR of the wanted signal and the interfering pulse, forwarding information about said relationship to the signal detector, and modifying a detection algorithm of the signal detector based on the received information.

9. The method of claim 8, wherein the interference-detection circuitry detects a power of the redirected fraction as said information about the presence of the interfering pulse, and wherein modifying the detection algorithm of the signal detector comprises modifying the detection algorithm based on the detected power.

10. The method of claim 9, wherein the directing step is performed on the incoming signal after band-pass filtering of the received signal for the first frequency band.

11. The method of claim 9, further comprising band-pass filtering the directed signal before detecting the power of the directed signal.

12. The method of claim 11, wherein the directed signal is band-pass filtered to filter out a second frequency band different from the first frequency band.

13. The method of claim 8, wherein information about the power of the directed fraction is forwarded directly to the signal detector.

14. The method of claim 8, wherein information about the power density spectrum of the interfering pulse is used to determine the presence of the interfering pulse.

15. The method of claim 8, further comprising the steps of detecting a normal SNR when no interfering pulse is present, predicting an SNR during an interfering pulse based on information about the power of the redirected fraction and the normal SNR and forwarding information about the predicted SNR to the signal detector.

* * * * *

UNITED STATES PATENT AND TRADEMARK OFFICE
CERTIFICATE OF CORRECTION

PATENT NO. : 8,582,704 B2
APPLICATION NO. : 12/936726
DATED : November 12, 2013
INVENTOR(S) : Axnäs et al.

It is certified that error appears in the above-identified patent and that said Letters Patent is hereby corrected as shown below:

On the title page, item (75), under "Inventors", in Column 1, Line 1, delete "Axnas," and insert -- Axnäs, --, therefor.

On the title page, item (75), under "Inventors", in Column 1, Line 1, delete "Bjork," and insert -- Björk, --, therefor.

On the title page, item (75), under "Inventors", in Column 1, Line 2, delete "Goteborg" and insert -- Göteborg --, therefor.

On the title page, item (75), under "Inventors", in Column 1, Line 2, delete "Ringstrom," and insert -- Ringström, --, therefor.

On the title page, item (74), under "Attorney, Agent, or Firm", in Column 2, Line 1, delete "Bennet," and insert -- Bennett, --, therefor.

In the Specification

In Column 1, Line 27, delete "infra-system" and insert -- intra-system --, therefor.

In Column 2, Line 18, delete "steps of" and insert -- steps of: --, therefor.

In Column 5, Line 56, delete "band 132" and insert -- band B2 --, therefor.

Signed and Sealed this
Sixteenth Day of September, 2014

Michelle K. Lee
*Deputy Director of the United States Patent and Trademark Office*